(12) United States Patent
Watanabe et al.

(10) Patent No.: US 6,587,638 B1
(45) Date of Patent: Jul. 1, 2003

(54) RECORDING/ REPRODUCING APPARATUS AND INPUT/ OUTPUT DEVICE

(75) Inventors: Katsuyuki Watanabe, Mito (JP); Hideo Nishijima, Hitachinaka (JP); Hiroo Okamoto, Yokohama (JP); Motoyoshi Sasaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/399,085

(22) Filed: Sep. 20, 1999

(30) Foreign Application Priority Data

Aug. 2, 1999 (JP) .......................................... 11-218375

(51) Int. Cl.[7] ................................................ H04N 5/91
(52) U.S. Cl. .......................................... 386/94; 386/95
(58) Field of Search ........................... 386/46, 94, 95, 386/111, 112, 12, 37, 68; 380/203

(56) References Cited

U.S. PATENT DOCUMENTS

| | | | | |
|---|---|---|---|---|
| 5,715,356 A | * | 2/1998 | Hirayama et al. | 386/96 |
| 5,778,064 A | * | 7/1998 | Kori et al. | 380/5 |
| 5,822,425 A | * | 10/1998 | Ezaki et al. | 380/5 |
| 5,883,959 A | * | 3/1999 | Kori | 380/9 |
| 5,978,546 A | * | 11/1999 | Abe et al. | 386/124 |
| 6,078,721 A | * | 6/2000 | Uchimi et al. | 386/68 |

OTHER PUBLICATIONS

Japanese Patent Abstract No. 7-274115 published Oct. 20, 1995.

* cited by examiner

*Primary Examiner*—Huy Nguyen
(74) *Attorney, Agent, or Firm*—Antonelli, Terry, Stout & Kraus, LLP (57) ABSTRACT

A recording/reproducing apparatus is provided for effecting digital processing to convert an analog video signal into a digital signal without losing character data superimposed over a vertical blanking period of the analog video signal. The recording/reproducing apparatus for converting the analog video signal into the digital signal and recording/reproducing the converted digital signal has a detector which detects character data, which is superimposed over the vertical blanking period of the received analog video signal, at the recording time. A superimposer which encodes the detected character data and superimposes the encoded character data over a digital signal from which the character data was removed, whereby the digital signal with the superimposed character data is recorded on the recording media. There is also a detector which detects first copy guard data superimposed over the vertical blanking period and second copy guard data superimposed over a color burst signal; and an adder which adds the two detected copy guard data to a signal reproduced from the recording media.

23 Claims, 11 Drawing Sheets

| NO | MODE | MONITOR OUTPUT | RECORD | SW (7) | SW (21) | CC, CGMS_A COPY GUARD SIGNAL, ETC. |
|---|---|---|---|---|---|---|
| 1 | ANALOG RECORD | THROUGH | ANALOG | WHITE | BLACK | — |
| 2 | | CODEC OUTPUT | | WHITE | WHITE | EXTRACT → ADD |
| 3 | DIGITAL RECORD | THROUGH | MPEG_ENC | WHITE | BLACK | — |
| 4 | | CODEC OUTPUT | | WHITE | WHITE | EXTRACT → ADD |
| 5 | ANALOG REPRODUCE | RECORD/REPRODUCE | — | BLACK | BLACK | RECORD/REPRODUCE |
| 6 | | REPRODUCE → CODEC | — | BLACK | WHITE | EXTRACT → ADD |
| 7 | DIGITAL REPRODUCE | MPEG_DEC | — | * | WHITE | ADD |

*: BLACK OR WHITE

| NO | MODE | MONITOR OUTPUT | | RECORD | SW (21) | CC, CGMS_A COPY GUARD SIGNAL, ETC. |
|---|---|---|---|---|---|---|
| 1 | RECORD | THROUGH | | MPEG_ENC | BLACK | — |
| | | CODEC OUTPUT | | | WHITE | EXTRACT → ADD |
| 2 | REPRODUCE | MPEG_DEC | | — | WHITE | ADD |

ORDINARY BURST PORTION

FIG. 8 (b)

COLOR STRIPE PORTION

FIG. 8 (c)

CONTINUITY OF COLOR STRIPE

WITHOUT DEMODULATION AXIS SHIFT

FIG. 11 (b)

WITH DEMODULATION AXIS SHIFT

RECORDING/REPRODUCING APPARATUS AND INPUT/OUTPUT DEVICE

BACKGROUND OF THE INVENTION

The present invention relates to a recording/reproducing apparatus and to an input/output device for performing digital compression/expansion of input analog video signals or the like; and, more particularly, the invention relates to compression/expansion processing and to a suitable processing technique for using copy guard data or character data in that processing.

In the typical household analog VTR of the prior art, the problem of preventing people from making illegal copies or the like has become more and more serious as the number of soft tapes increases. From the standpoint of copyright protection, the making of unauthorized copies has been prevented by superimposing pseudo-sync pulses as a copy guard signal over a vertical blanking period to promote a malfunction (in compressions) of an AGC (Automatic Gain Control) circuit at the time of dubbing using the VTR, thereby to significantly disturb reproduction of a recorded picture.

To a soft disc conforming to the DVD (Digital Video Disc) standards determined in recent years, on the other hand, there are added not only the aforementioned pseudo-sync pulses, but also a copy guard signal called a "Colorstripe". In a device, such as a VTR having a system for synchronizing a signal used as a reference for color signal processing with a burst signal inputted at the recording time, the Colorstripe will invert the color burst signal by 180 degrees in phase at a constant interval of lines in the vicinity of the burst center. This inversion disturbs the hue seriously so as to cause a hue defect in the form of transverse stripes so that a protection of the copyright for the recorded data may be achieved.

These copy preventing functions are effective in an analog VTR, but not in a digital VTR or the like. However, Japanese Patent Laid-open No. Hei 9-102929 discloses a technique which is capable of preventing the copying of proprietary data even between digital VTRs. According to this technique, a disturbing signal, such as the pseudo-sync pulses or the Colorstripe signal, is latched in an area which is retained by erecting a disturbing signal flag, and a disturbing signal at a reproducing time is restored on the basis of the flag, so that flag can be transmitted even during signal transfer through a digital interface to effect copy prevention.

Of the household digital VTRs produced in recent years, on the other hand, there has been produced a floor VTR based on DV standards using a magnetic tape of 6 mm width. This floor VTR elongates the recording time period by using a picture compression/expansion technique, and this compressing/expanding digital VTR is expected to be a main component of the household in the future. There has also been produced a VTR which is given enhanced compatibility over the existing analog VTR by adding a new digital VTR mode to the existing household analog VTR mode. There is also a VTR which covers a digital broadcasting program to record a bit stream signal from a digital tuner (IRD) as it is. The signals to be obtained from the digital tuner contain many types of data, such as character data, and many digital VTRs can produce a highly fine OSD screen with such data using a digital OSD (On Screen Display) circuit, unlike the existing analog VTR.

SUMMARY OF THE INVENTION

The known types of digital VTR thus far described include a copy preventing technique based on compression/expansion, but the industry has failed to provide a household VTR utilizing that technique. In other words, there has not been a household VTR exploiting the compression/expansion technique. Moreover, that prior art example has made use only of a copy guard signal, but not of the recording processing of a closed caption signal (of character data) to be superimposed over a vertical blanking period in a digital device nor of the reproduction of such data from the digital device.

Generally, in a recording/reproducing apparatus, such as a VTR, on the other hand, an EE (i.e., the output having passed through only an electric path to a monitor) screen is outputted to a monitor TV even during the recording mode of operation. In a digital device utilizing a digital compression/expansion technique, the quality of a picture (considerably varied by the compression) to be recorded in the recording/reproducing apparatus has to be checked to monitor the recording picture quality, because of the differences from the EE picture quality being monitored. On the other hand, consideration has to be given to a specific processing of the data, such as the copy guard signal processing, superimposed over the vertical blanking period, in the EE output signal at the aforementioned time of checking the picture quality.

In a digital device utilizing a digital compression/expansion technique, moreover, the quality of the picture to be recorded in the recording/reproducing apparatus is hard to manage due to the change in the recording transmission rate. In order to provide a recording/reproducing apparatus of excellent cost performance, on the other hand, the aforementioned highly fine OSD circuit has to be effectively utilized not only for bit stream recording, but also for external video input recording or for signal reproduction, but no application for this has been disclosed.

Moreover, there may be a soft tape of a VTR which contains copy guard data in the form of only pseudo-sync pulses, or a soft tape in which the copy guard data is partially deficient, as is the case of an illegal apparatus, such as a copy guard signal eliminating apparatus. Thus, it is necessary to ensure the copy guard function sufficiently, even with use of only one of the pseudo-sync pulses or the Colorstripe signal.

An object of the invention is to solve those problems and to provide a recording/reproducing apparatus and an input/output device which are characterized in that they employ the compression/expansion technique to realize protection of character data and a copy guard signal, as well as an effective utilization of a highly fine OSD circuit, thereby to achieve a satisfactory cost performance and a high picture quality.

In order to achieve the above-specified object, according to the invention, there is provided a recording/reproducing apparatus comprising: a converter which converts a received analog video signal into a digital signal; a recorder which records the converted digital signal on a recording media; a reproducer which reproduces a digital signal from the recording media; and a converter which converts the reproduced digital signal into an analog video signal, wherein the improvement comprises: a detector which detects the character data, which is superimposed over a vertical blanking period of the analog video signal, at the time of recording; and a superimposer which encodes said detected character data and superimposes the encoded character data over a digital signal from which said character data has been removed, whereby the superimposed signal is recorded on the recording media.

Further, in accordance with the invention, there is provided a recording/reproducing apparatus comprising: a converter which converts a received analog video signal into a digital signal; a recorder which records the converted digital signal on a recording media; a reproducer which reproduces a digital signal from the recording media; and a converter which converts the reproduced digital signal into an analog video signal, wherein the improvement comprises: an extractor which extracts character data from the digital signal which is read out from the recording media at the reproducing time; and an adder which adds the extracted character data to a predetermined position in the reproduced digital video signal, whereby the analog video signal converted from the digital video signal by said converter is outputted.

Further, in accordance with the invention, there is provided a recording/reproducing apparatus comprising: a converter which converts a received analog video signal into a first digital signal; a compressor which compresses the first digital signal to form a compressed digital signal; a recorder which records the compressed digital signal on a recording media; a reproducer which reproduces the compressed digital signal from the recording media; and an expander which expands the compressed digital signal, wherein the improvement comprises: a switcher which switches the first digital signal and the compressed digital signal; and a converter which converts the output of the switcher into an analog video signal, whereby the converted analog video signal is outputted to a picture display device.

Moreover, in accordance with the invention, on the other hand, there is provided a recording/reproducing apparatus comprising: a converter which converts a received analog video signal into a digital signal; a compressor which compresses the converted digital signal; a recorder which records the compressed digital signal on a recording media; a reproducer which reproduces the compressed digital signal from the recording media; and an expander which expands the compressed digital signal, wherein the improvement comprises: a converter which converts a compressed/expanded digital signal into an analog video signal; and a switcher which switches the analog signal before being converted into a digital signal and a compressed/expanded second analog signal, whereby the analog video signal is displayed in a picture display device, and wherein the improvement further comprises: a detector which detects data, which is superimposed over a vertical blanking period to be deleted in the process of compression/expansion, at an upstream side of the compressor; a superimposer which encodes and superimposes said detected data over said compressed signal; and an adder which extracts said superimposed data and adds the extracted data to the signal expanded by the expander, whereby the output obtained from said adder is obtained as said second analog signal. Here, the data extracted by said detector is preferably sent through a microcomputer to said adder.

Further, in accordance with the invention, on the other hand, there is provided a recording/reproducing apparatus comprising: a converter which converts a received analog video signal into a digital signal; a compressor which compresses the converted digital signal; a recorder which records the compressed signal on a recording media; a reproducer which reproduces the digital signal from the recording media; and an expander which expands the compressed signal, said apparatus having a recording/reproducing digital mode and an analog mode for recording/reproducing the received analog video signal in an analog state, wherein the improvement comprises: a converter which converts a compressed/expanded digital signal into an analog video signal; and a switcher which switches a first analog signal before being encoded and a compressed/expanded analog signal, whereby the analog video signal is displayed in a picture display device, and wherein the improvement further comprises: a detector which detects data, which is superimposed over a vertical blanking period to be deleted in the process of compression/expansion, at an upstream side of the compressor; a superimposer which encodes and superimposes said detected data over said compressed signal; and an adder which extracts said superimposed data and adds the extracted data to the signal expanded by the expander, whereby the output obtained from said adder is obtained as said second analog signal.

Here, said compressor preferably has a variable transmission rate, and said second analog signal is preferably utilized as a check mode for executing the optimum setting of said transmission rate for influencing the picture quality.

Further, in accordance with the invention, a digital OSD (On Screen Display) screen is produced at the downstream side of said expander, whereby at the reproducing time in the digital mode, at the time of inputting an external composite signal and at the reproducing time in the analog mode, said second analog signal compressed/expanded at all times is fixed at an output so that a digital OSD screen is displayed in a picture display device.

Further, in accordance with the invention, the path for obtaining said second analog signal includes: a video decoder which decodes the analog video signal into a luminance signal and a color difference signal; a compressor which compresses the output of the video decoder; an expander which expands the compressed signal; an adder which adds said data; and a video encoder which converts the output of the adder into an analog video signal, and at the downstream side of said expander, there is arranged a switch circuit which switches the output of said video decoder and the output of the expander, and there is arranged a digital OSD circuit at the downstream side of the switch circuit, whereby one compressed/expanded signal passing at all times through the digital OSD circuit and the vide decoded/encoded signal can be switched as said second analog signal.

Moreover, in accordance with the invention, there is provided a recording/reproducing apparatus comprising: an AD converter which converts an input analog video signal into a digital signal; a compressor which compresses the output of said AD converter; a recorder which records the output of said compressor on a recording media; a reproducer which reproduces the digital signal from said recording media; an expander which expands the output of said reproducer; and a DA converter which converts the output of said expander into analog video signal, wherein the improvement comprises: a detector which detects first copy guard data superimposed over a vertical blanking period of said input analog video signal and second copy guard data superimposed over a color burst signal; and an adder which adds said first and second copy guard data detected by said detector to the signal expanded by said expander, whereby the output of said compressor is fed to said expander in modes other than the reproducing mode by said reproducer.

Here, the copy guard data extracted by said detector os preferably sent through a microcomputer to said adder. The microcomputer preferably adjusts a delay in the signal, caused in said compression/expansion process, and a delay in the copy guard data extracted by said detector. On the other hand, said second copy guard data is preferably detected on the basis of the signal which is demodulated from an incoming modulated color signal with respect to a B-Y axis.

The recording/reproducing apparatus further comprises: an analog recorder which records the received analog video signal on the recording media as it is in the analog state; and an analog reproducer which reproduces the analog signal from said recording media. The second copy guard signal is preferably detected on the basis of the data from an APC (Auto Phase Control) circuit, contained in said analog recorder for phase-locking the color burst signal contained in the input analog video signal and a color subcarrier to be used as a reference signal of said analog recorder.

Further, in accordance with the invention, there is provided a recording/reproducing apparatus comprising: an AD converter which converts an input analog video signal into a digital signal; a compressor which compresses the output of said AD converter; an expander which expands the compressed signal; and a DA converter which converts the output of said expander into an analog video signal, wherein the output of said compressor is fed to said expander, and wherein the improvement comprises: a detector which detects first copy guard data superimposed over a vertical blanking period of said input analog video signal and second copy guard data superimposed over a color burst signal; and an adder which adds said first and second copy guard data detected by said detector to the signal expanded by said expander.

BRIEF DESCRIPTION OF THE SEVERAL VIEWS OF THE DRAWINGS

These and other objects, features and advantages of the present invention will become more readily apparent from the following detailed description when taken in conjunction with the accompanying drawings, wherein.

DETAILED DESCRIPTION OF THE INVENTION

Figure 1:
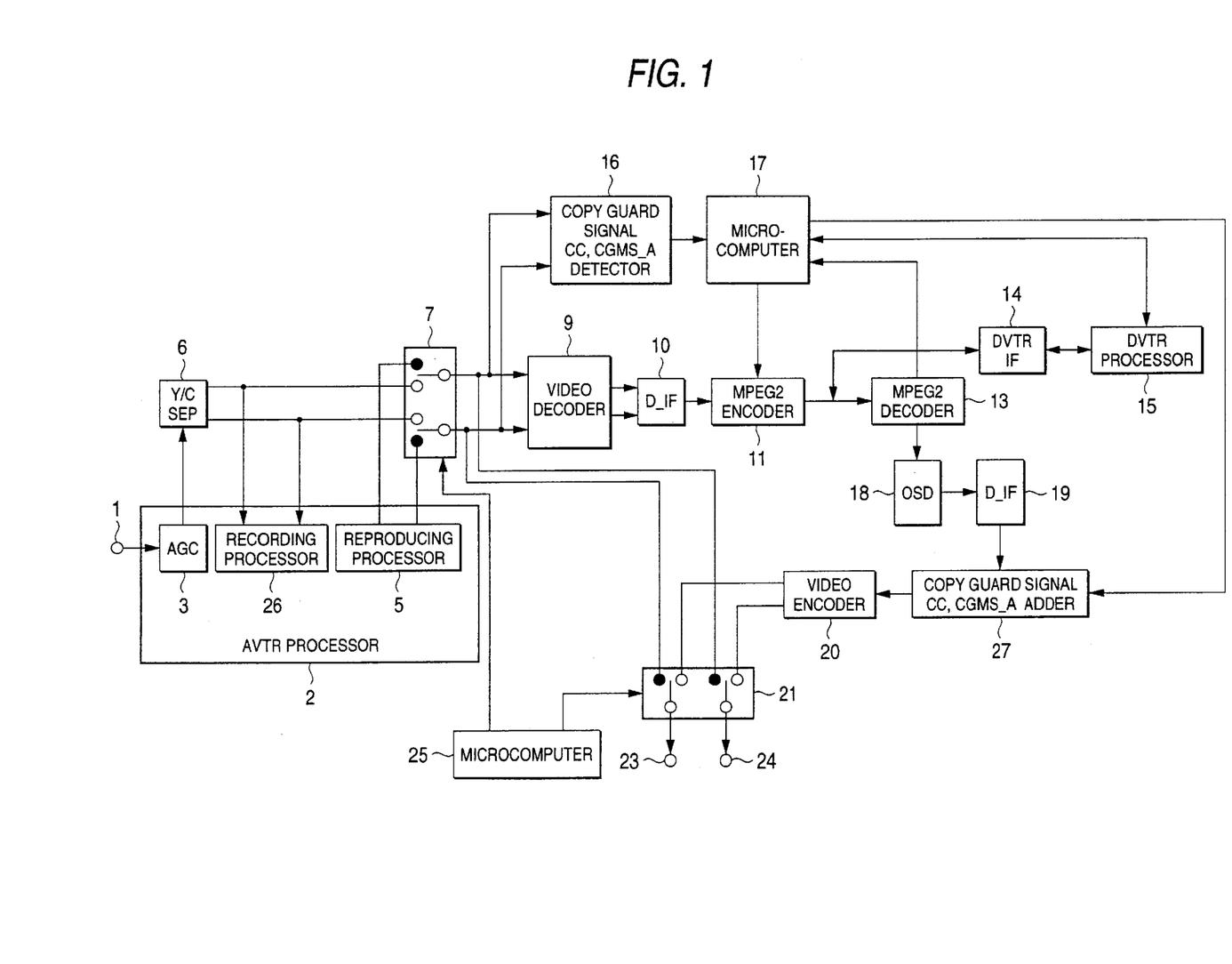
FIG. 1 is a block diagram showing a recording/reproducing apparatus according to a first embodiment of the invention.

A first embodiment of the invention will be described with reference to FIG. 1. FIG. 1 is a system block diagram of a digital VTR having an MPEG encoder/decoder mounted thereon. This embodiment will be described by exemplifying an existing system in which an analog VTR mode and a digital VTR mode are included together. Of these, the analog mode will be described at first. Reference numeral 2 designates an analog VTR (or AVTR, as shown) signal processor. Composite video signals, inputted from a terminal 1, are controlled at an AGC (Automatic Gain Control) circuit 3 to a constant amplitude and are separated at a Y/C separator 6 into luminance signals Y and color difference signals C. These luminance signals and color difference signals are processed at a recording processor 26 and are then recorded through a magnetic head on a magnetic tape (not shown). The signals, reproduced from the magnetic tape, are processed at a reproducing signal processor 5 so that the reproduced luminance signals and the reproduced color difference signals are outputted through switches 7 and 21 and are applied to terminals 23 and 24, respectively. At the recording time, too, the outputs (i.e., the luminance signals and the color difference signals) of the YC separator 6 are outputted through the switches 7 and 21 to the terminals 23 and 24, respectively.

In the digital mode, at a recording time, the YC-separated signals are inputted through the switch 7 to a video decoder 9 so that they are converted at an AD converter at the input stage of the decoder into digital signals and are demodulated at the decoder into luminance signals and color difference signals. These signals are converted in a digital interface 10 (which will be called the "digital IF") into the clock rate of an MPEG2 encoder 11 and are transmitted to the MPEG2 encoder 11. The output of the MPEG2 encoder 11 is applied through a DVTR (i.e., an abbreviation of "digital VTR") interface (which will be called the DVTR_IF") 14 to a DVTR signal processor 15 where it is processed and recorded on the magnetic tape.

Figure 6:
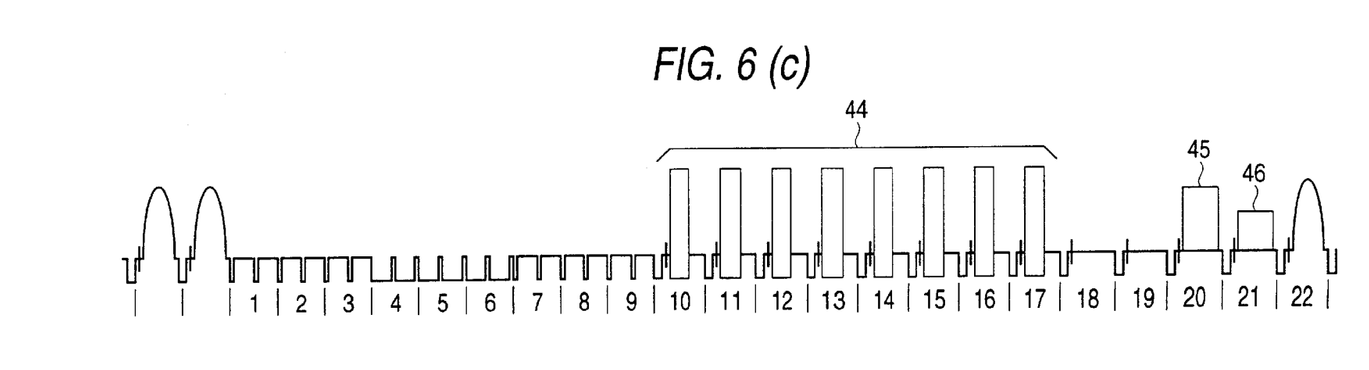
FIGS. 6(a) to 6(c) are diagrams illustrating data superimposed for a vertical blanking period.

With reference to FIGS. 6(a) to 6(c), how the data is inserted into a vertical blanking period will be described. FIGS. 6(a) to 6(c) are diagrams illustrating the waveforms of the vertical blanking period of NTSC video signals. Pseudo-sync signals 41 for providing a copy guard function are inserted into periods 10 to 17H (wherein letter H indicates the horizontal scanning period); a CGMS_A signal 42 for copy management is inserted into a period 20H; and a closed caption signal 43 (abbreviated to "CC" in FIG. 1) or letter data is inserted into a period 21H. Of these signals, the CGMS_A signal may be rewritten after copying, but the remaining data should not change in the recording/reproducing process performed in the VTR. The signals, which are detected at a detector 16 at the recording time, are encoded and are stored together with the video signals in the MPEG2 encoder 11 by the microcomputer 17. At the reproducing time, in the MPEG2 decoder 13, the aforementioned signals are fetched by the microcomputer 17 and sent to an adder 27, in which they are added to the MPEG2-decoded video signals.

On the other hand, there are also copy guard signals for the color signals, called "Colorstripe" signals, although not shown in FIG. 6(a). These Colorstripe signals operate to disturb the hue in a dubbing mechanism of the VTR or the like by inverting the color burst signals every 21 lines in the course of the 4-line burst signals. The presence of these Colorstripe signals is also detected at the detector 16 and they are restored at the adder 27 at the reproducing time.

In order that signals may be transferred from the video decoder 9 to the MPEG2 encoder 11, generally, they are converted at the digital IF 10 into signals conforming to the ITU-R recommendation 656. The signals of the ITU-R recommendation 656 are of the time sharing multiplex type in which the luminance signals and the color difference signals (Cr and Cb) occur at the data rate of 27 MHz in the ratio of 4:2:2, and the sync signal data of the horizontal blanking period and the vertical blanking period are encoded and superimposed as video timing reference codes. At this instant, the data, superimposed over the vertical blanking period, will disappear. Therefore, the signals have to be detected at the upstream side of the digital IF 10 at the detector 16 and have to be superimposed again at the MPEG2 encoder 11 by the microcomputer 17. After this, the signals are sent to and recorded in the DVTR signal processor 15.

The signals, reproduced from the magnetic tape, are reproduced at the DVTR signal processor 15 and expanded at the MPEG2 decoder 13 so that they pass through an OSD circuit 18. In a digital IF 19, the signals are converted into an easily decodable form by extracting the sync signal data of the horizontal blanking period and the vertical blanking period, superimposed as video timing reference codes. After this, the data to be inserted into the vertical blanking period, such as the copy guard signals, the closed caption signals and the CGMS_A signal, which are extracted at the MPEG2 decoder 13 by the microcomputer 17, are added at the adder 27. Then, the added data is modulated at the video encoder 20 into the luminance signals and the color difference signals, which are outputted through the switch 21 to the output terminals 23 and 24, respectively. Here, at the output stage of the video encoder 20, there is a DA converter for converting digital signals into analog signals, although this feature is omitted from FIG. 1.

Although the fundamental recording/reproducing operations of the VTR system have been described, the present embodiment is newly provided with a path for outputting compressed/expanded video signals to a monitor screen in the recording mode no matter whether the signals are analog or digital. In other words, the embodiment is characterized by providing a digital EE path which is outputted through the video decoder 9, the digital IF 10, the MPEG2 encoder 11, the MPEG2 decoder 13, the OSD circuit 18, the digital IF 19, the adder 27, the video encoder 20 and the switch 21. The provision of such a digital EE path results in the following advantages.

Firstly, the provision of the EE path provides the advantage that the present recording picture quality can be confirmed. The MPEG encoder generally makes the transmission rate variable and sets it according to a particular purpose. At the lower transmission rate, the recording time becomes longer, while the picture quality becomes worse. At the higher transmission rate, on the other hand, the recording time becomes shorter, while the picture quality becomes better. By using this function, it is possible to provide a VTR which is so well usable that a change in the setting of the transmission rate can be selected by the user through switches attached to the set or through a menu screen. Secondly, another advantage is that a highly fine OSD screen can be outputted through the digital OSD circuit 18 on the digital EE data to the monitor screen.

In a household digital VTR utilizing picture compression/expansion, a variety of character data are superimposed on the digital signals coming from a digital tuner (although not shown in FIG. 1) such as an IRD so that a highly fine OSD function is added. However, what should be noted here is that the copy guard signals or the closed caption signals, which are superimposed over the vertical blanking period and are lost in the course of compression/expansion of the picture, as has been described hereinbefore, have to be restored to a state similar to that in which they were inputted. FIG. 6(a) illustrates the input video signals, and FIG. 6(b) presents the waveform at the time when the data has not been restored. The output of these signals from the EE output will allow a free copy. As shown in FIG. 6(c), therefore, pseudo-sync signals 44, a CGMS_A signal 45 and a closed caption signal 46 have to be restored again and outputted to the EE output.

The description thus far has been directed to the EE output at the time when the external signals are inputted. In this embodiment, however, when a recording/reproducing operation in the analog mode is to be carried out, the ordinary reproduced signals are outputted through the switch 7 and the switch 21 to the output terminals 23 and 24. The OSD circuit which is used in this case is an analog OSD (although not shown) and is not so highly fine as the digital OSD, so that a highly fine OSD screen cannot be achieved using the ordinary output path. Even for the reproduced signals in the analog mode, therefore, the highly fine digital OSD circuit 18 can be utilized by selecting and outputting signals through the compression/expansion path via the white contacts of the switch 21, after the passage of these signals through the switch 7.

Figure 2:
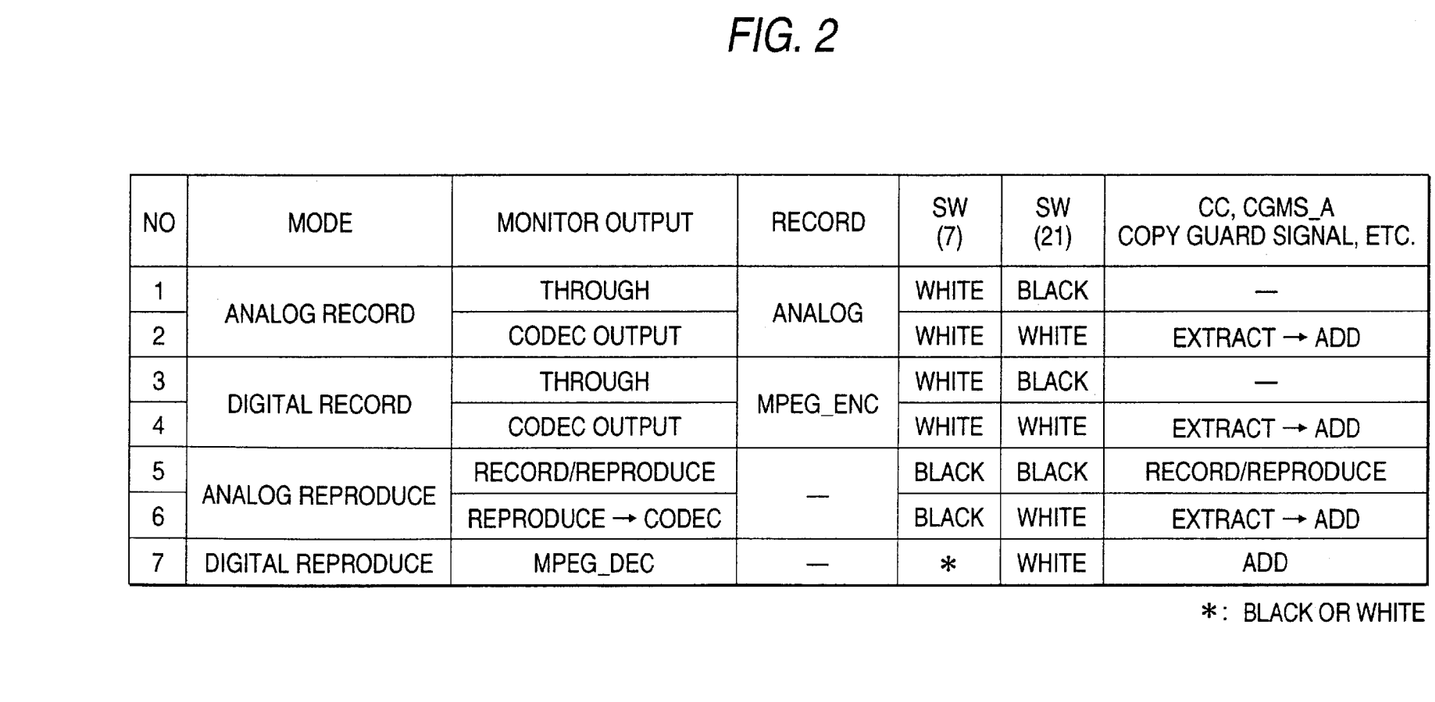
FIG. 2 is a diagram tabulating mode switching operations in the first embodiment.

FIG. 2 tabulates the switching operations of the switch 7 and the switch 21, as shown in FIG. 1, and the connections with the white and black contacts of the switches. No matter whether the recording operation might be analog or digital, the EE output is switched by the switch 21 between a through signal and a signal which has passed through the encoder/decoder of the MPEG2. At the analog reproduction time, a switching operation is likewise performed by the switch 21 between the ordinary reproduced signal and the signal which has passed through the encoder/decoder of the MPEG2. A CODEC designation in the Table indicates a signal which has passed through the encoder/decoder of the MPEG2, that is, which has been compressed/expanded. On the other hand, the reproduction→ CODEC designation indicates a signal which has been compressed/expanded from the reproduced analog signal, and the MPEG_DEC designation indicates a signal which has been expanded in the MPEG2 decoder.

Figure 3:
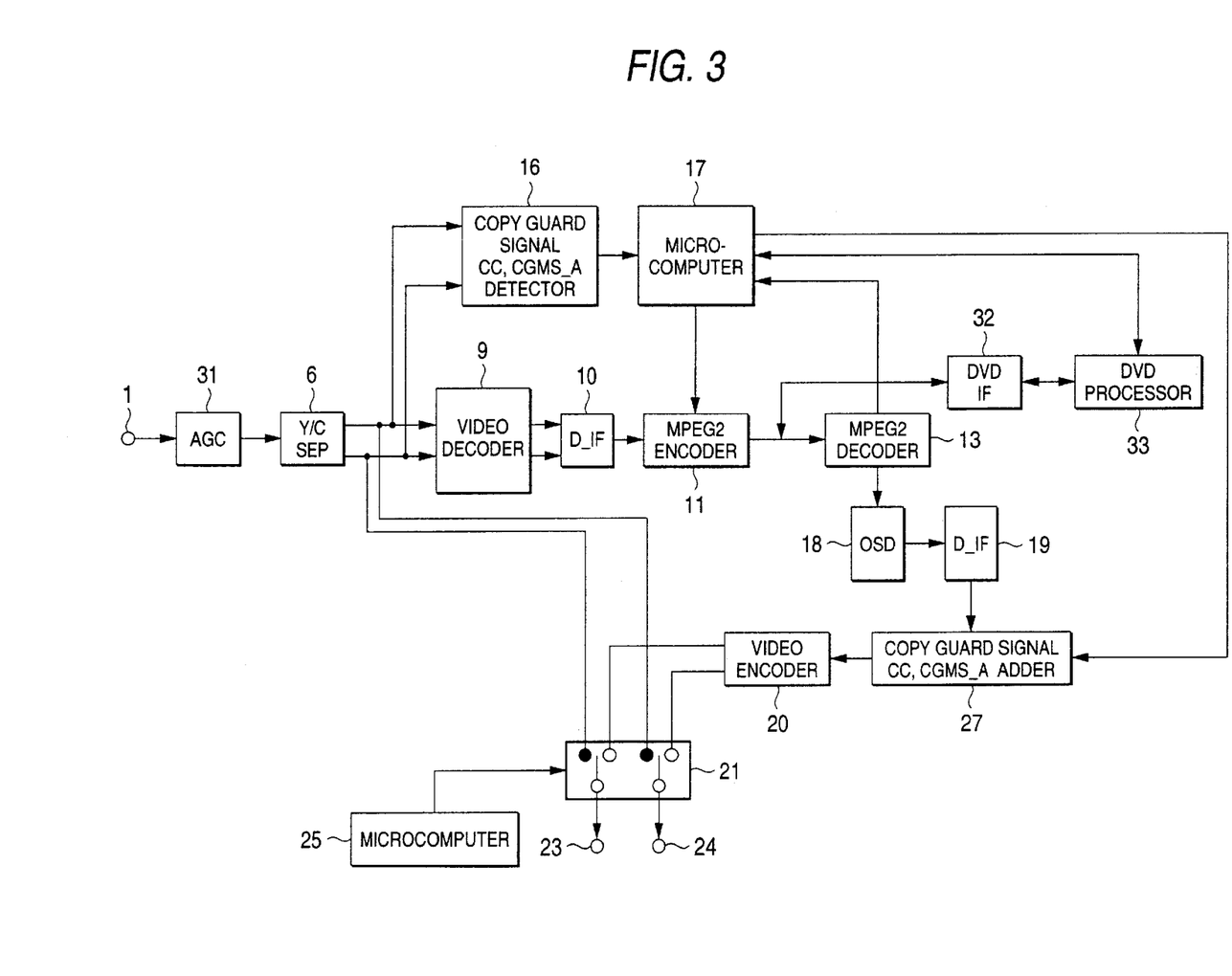
FIG. 3 is a block diagram showing a recording/reproducing apparatus according to a second embodiment of the invention.

Next, a second embodiment of the invention will be described with reference to FIG. 3. FIG. 3 shows a recording/reproducing apparatus using a DVD_RAM and having only a digital recording/reproducing operation, unlike the aforementioned VTR in which the analog mode and the digital mode are included together. The description of portions similar to those of FIG. 1 will be omitted. Unlike the digital VTR shown in FIG. 1, the analog VTR signal processing block is eliminated so that the AGC circuit 31 is independently provided. The signal processing after passage through the AGC is substantially similar to that of FIG. 1, except that the switch 7 is eliminated. Another difference from FIG. 1 resides in the fact that the interface to be connected to the MPEG2 encoder 11 and the MPEG2 decoder 13 is replaced by a DVD interface 32 connected to a DVD signal processor 33.

Figure 4:
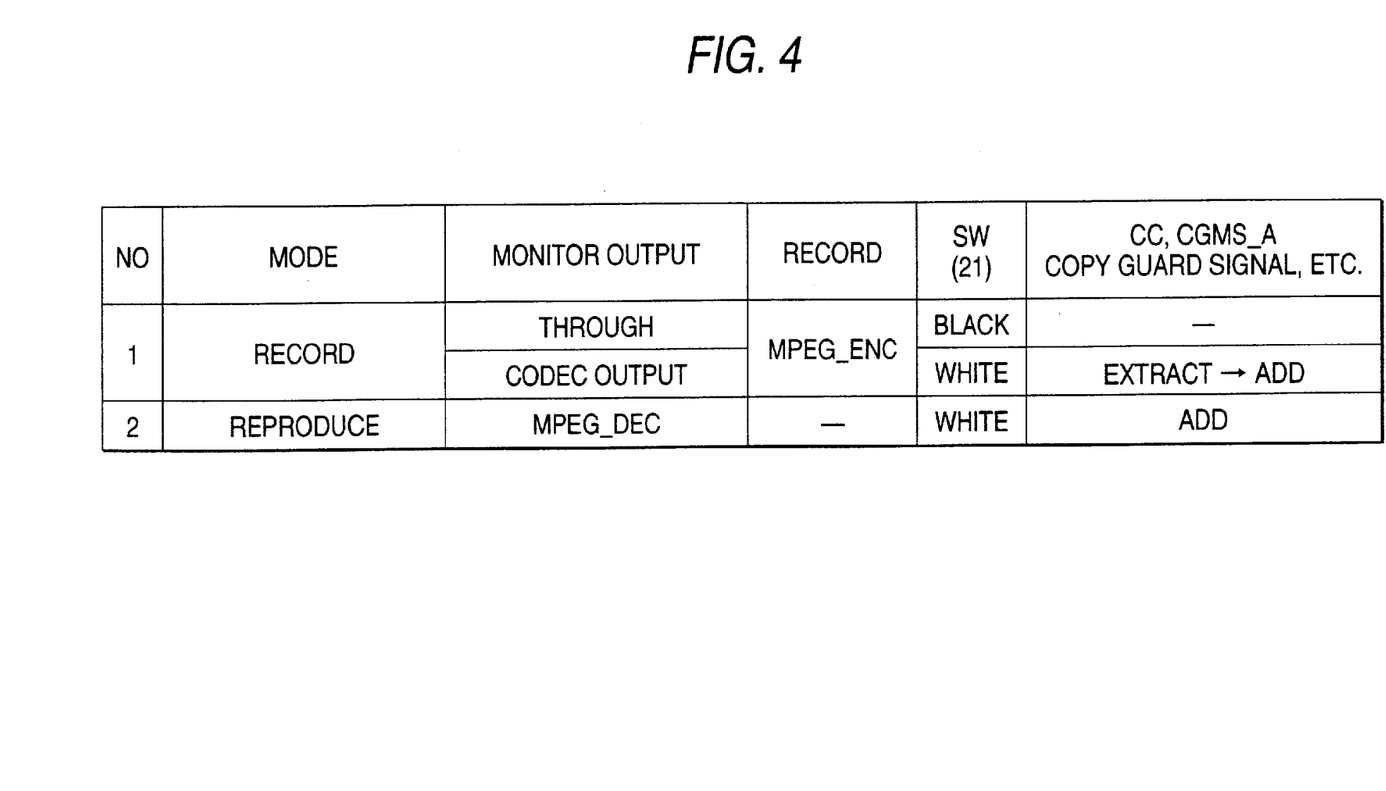
FIG. 4 is a diagram tabulating mode switching operations in the second embodiment.

FIG. 4 tabulates the mode switching operations of the switch 21 shown in FIG. 3. By outputting the compressed/ expanded signal pulses as an EE output even in a device having only a digital recording/reproducing operation, as described hereinbefore, the following advantages are achieved: a confirmation of the recording picture quality; a setting of the picture quality by the user; and a realization of a highly fine digital OSD screen, as in the embodiment of FIG. 1.

Figure 5:
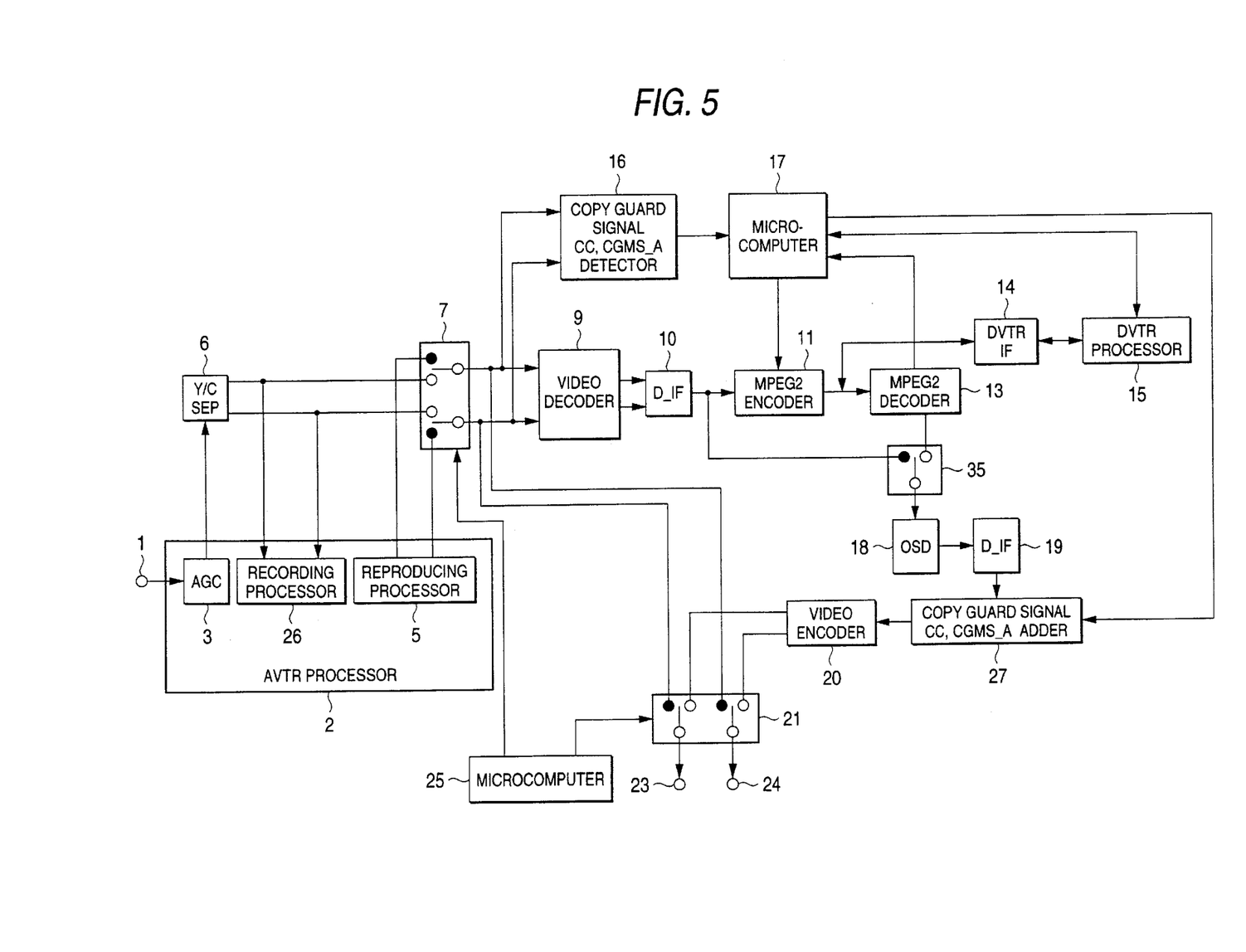
FIG. 5 is a block diagram showing a recording/reproducing apparatus according to a third embodiment of the invention.

Next, a third embodiment will be described with reference to FIG. 5. In the embodiment of FIG. 5, unlike the embodiment of FIG. 1, a switch 35 is disposed at the upstream side of the OSD circuit 18 to switch the output signal of the digital IF 10 and the output of the MPEG2 decoder 13. As described hereinbefore, the digital OSD circuit can produce a far more highly fine OSD screen than that of the analog OSD circuit of the prior art and can enhance the quality of the set by ensuring an EE path and a reproducing path even in the analog mode at all times. However, the signals which have passed through the MPEG2 encoder 11 and the MPEG2 decoder 13 are caused to have more or less picture quality degradation due to the compression/expansion even if the transmission rate is raised.

The present embodiment provides actual means for preventing such degradation in advance, and so is able to provide a highly fine OSD screen. By switching the switch 35 to the black contact side, the signals, which have neither passed through the MPEG2 encoder 11 and the MPEG2 decoder 13 and therefore have not been compressed/expanded, can be converted through the highly fine OSD circuit 27 at the video encoder 20 into analog video signals and outputted. Moreover, excellent analog video signals having a high picture quality and which are capable of producing a highly fine OSD display can be outputted to the monitor. By switching the switch 35 to the white contact side, on the other hand, the quality of a picture being recorded can be checked.

Figure 7:
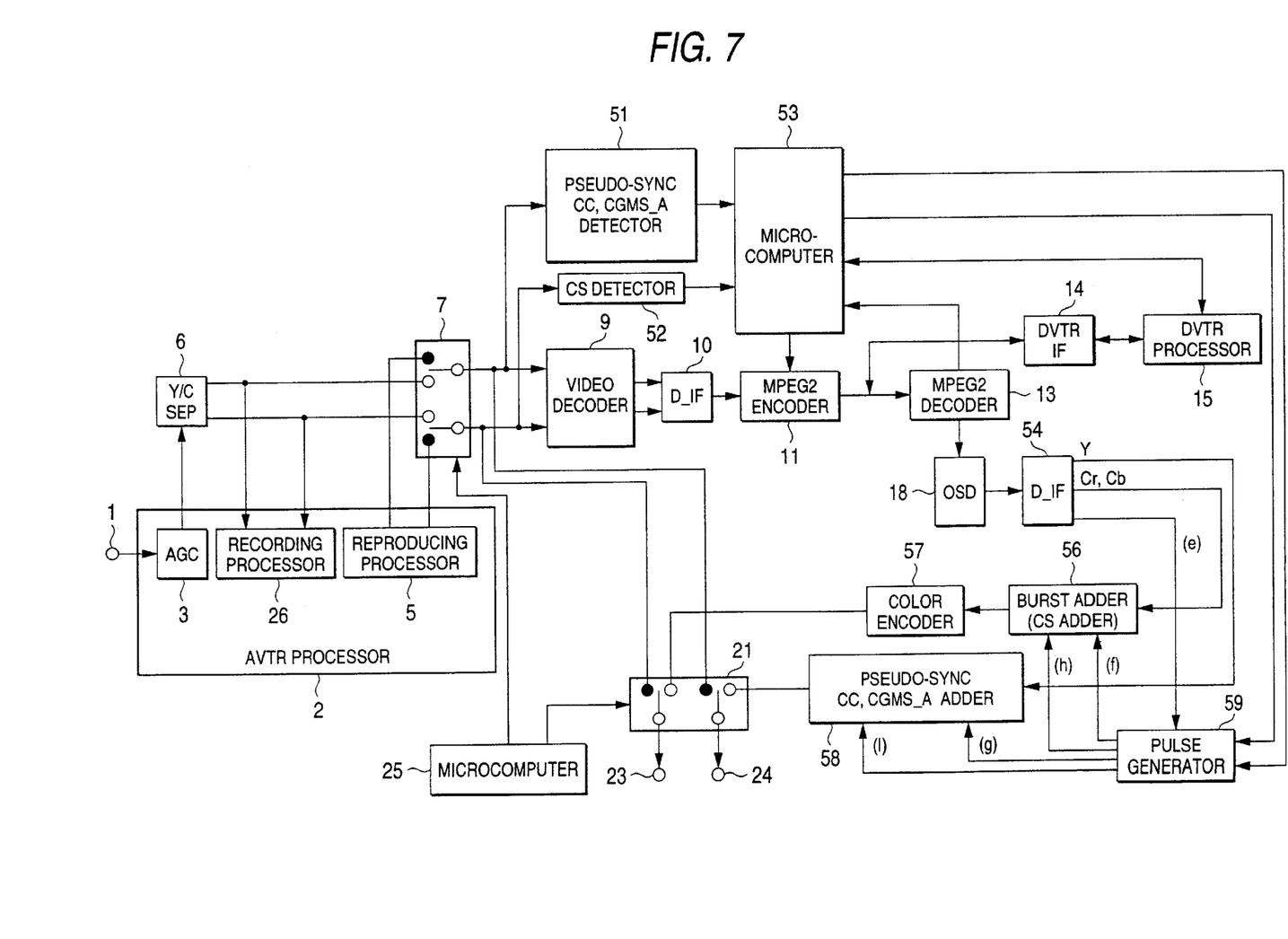
FIG. 7 is a block diagram showing a recording/reproducing apparatus according to a fourth embodiment of the invention.

A fourth embodiment of the invention will be described with reference to FIG. 7. This embodiment, as compared with that of FIG. 1, provides for the detection of pseudo-sync pulses and Colorstripe signals using an additional circuit in the digital EE path. A detector 51 detects pseudo-sync pulses, closed caption signals and CGMS_A signals from the luminance signals at the output of the switch circuit 7 and sends the detected data to a microcomputer 53. On the other hand, a Colorstripe detector 52 detects Colorstripe data from the color signals and sends the detected data to the microcomputer 53. As has been described hereinbefore, the digital EE path leads through a video decoder 9, a digital interface 10, an MPEG2 encoder 11, an MPEG2 decoder 13, a digital OSD circuit 18 and a digital IF 54 to a video encoder.

Here will be described in detail a process in which the signals sent from the digital IF 54 to the video encoder are converted into video signals. The input of the digital IF 54 comprises signals conforming to the ITU-R recommendation 656 so that the luminance signals and the color difference signals (Cr and Cb) are sent in the form of time sharing multiplex type signals at the data rate of 27 MHz in the ratio of 4:2:2. These signals are serial/parallel-converted at the digital IF 54 into luminance signals of 13.5 MHz and color difference signals (Cr and Cb), for example, which are sent to an adder 58 and a burst adder 56, respectively. The data sync signal of the horizontal blanking period and the vertical blanking period are encoded and superimposed as video timing reference codes so that they are separated and sent as the data (e) to a pulse generator 59. On the basis of the data (e), composite syncs and burst gate pulses at the burst added time are generated by the pulse generator 59, and the adder 58 and the burst adder 56 are supplied with the respective gate pulses (g) and (f). On the other hand, the copy guard data, which is detected upstream of the video encoder, is sent through the microcomputer 53 to the pulse generator 59 so that they are added again as (h) and (i) to the luminance signals and the color difference signals at the adder 58 and the burst adder 56, respectively. As to the luminance signals, the output of the adder 58 is outputted through the switch circuit 21 to the output terminal 24. As to the color difference signals, the output of the burst adder 56 is modulated at a color encoder 57 into an fsc band, which is outputted through the switch circuit 21 to the output terminal 23.

Figure 8:
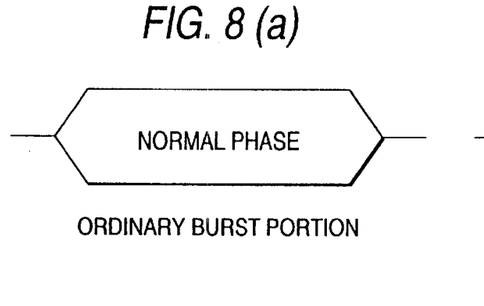
FIGS. 8(a) to 8(c) are diagrams illustrating various aspects of a Colorstripe signal schematically.

Next, the technique for detecting the Colorstripe signals will be described with reference to FIGS. 8(a) to 11(b). FIG. 8(a) is an enlarged diagram of an ordinary burst signal, the phase of which is continuous for the entire period. FIG. 8(b) illustrates an added burst portion of a Colorstripe signal, the second half of which is in the normal phase, while the first half of which is out of phase by 180 degrees, that is, is inverted in phase to establish a discontinuous point in phase in the vicinity of the center. In this burst signal, the normal phase continues for a period of 17H, as illustrated in FIG. 8(c), and a discontinuous burst is then inserted for a period of 4 H. The drawing shows an example of the NTSC broadcasting standards, in which there is a Colorstripe signal having a burst of a normal phase of 15 lines and a discontinuous burst of 2 lines.

Figure 9:
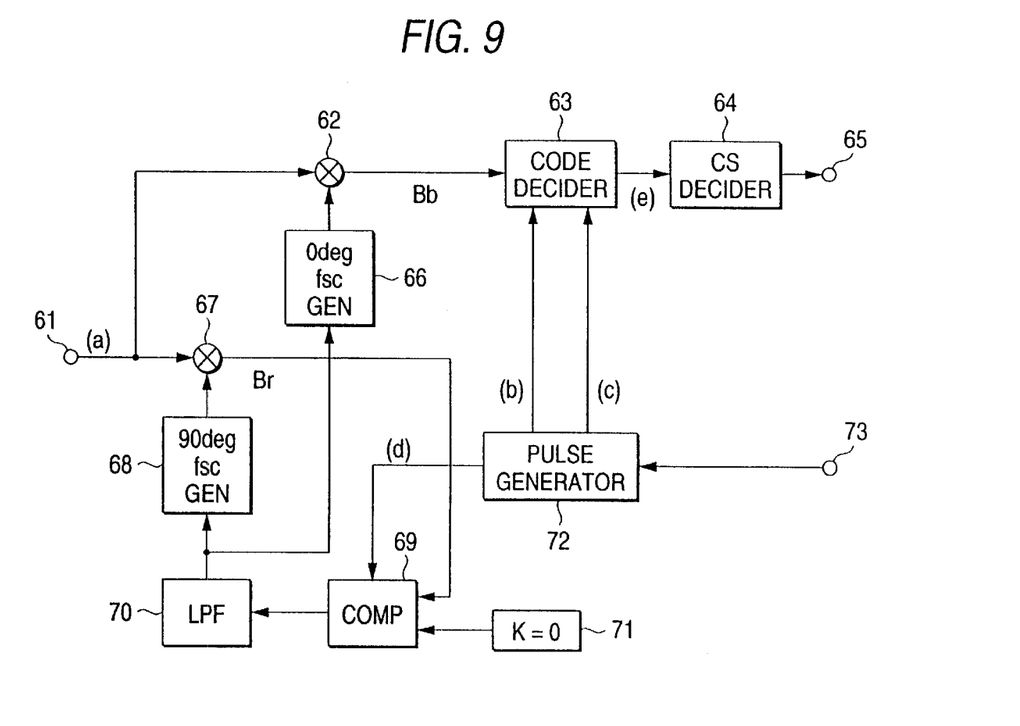
FIG. 9 is a block diagram showing details of the Colorstripe detector of the fourth embodiment.
Figure 10:
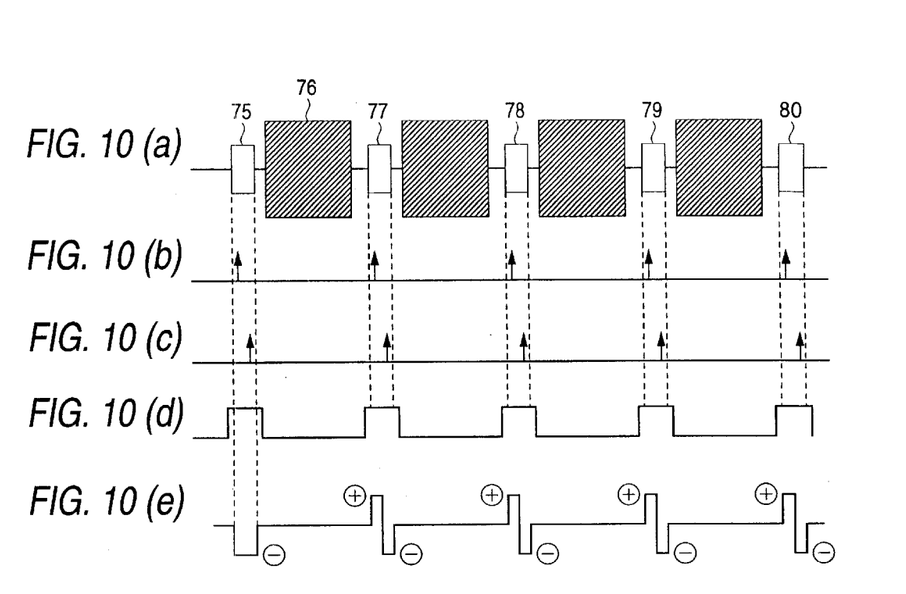
FIGS. 10(a) to 10(e) are diagrams of signal waveforms of individual portions at the time of operation of the Colorstripe detector of FIG. 9.
Figure 11:
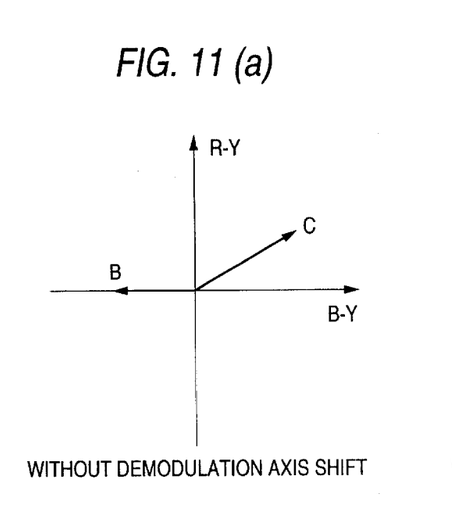
FIGS. 11(a) and 11(b) are vector diagrams illustrating the behavior of a demodulation of a modulated color signal.

FIG. 9 shows a specific construction of the Colorstripe detector 52. In the color signals conforming to the NTSC broadcasting standards, as shown in FIG. 11(a), a burst signal B has a phase of 180 degrees with respect to the B-Y axis so that a color is expressed with a phase difference between the burst signal B and a color signal C. With respect to such signals, a carrier signal in the direction of the B-Y axis is multiplied and demodulated. Then, the state shown in FIG. 11(b) is established with a shift in the demodulation axis. In order to correct this axial shift, a control may be carried out such that a result of Br multiplied by the carrier signal in the direction of the R-Y axis becomes zero, and the burst signal is positioned on the B-Y axis, as illustrated in FIG. 11(a). In this state, the R-Y axis component is always zero, and the B-Y axis component is always positioned in the direction of 180 degrees. If the burst signal is inverted, for example, the B-Y axis component is positioned in the direction of 0 degrees so that the B-Y component can be used for detecting the Colorstripe signal. The circuit for realizing this is shown in FIG. 9. In FIG. 9, a modulated color signal (a) from a terminal 61 is multiplied by a color subcarrier having a phase of 0 degrees and a color subcarrier of a phase of 90 degrees at multipliers 62 and 67, respectively, so that the B-Y axis component (Bb) and the R-Y axis component (Br) are produced. At this time, the component Br is exclusively compared with a constant (K=0) which is supplied by a coefficient unit 71 for a burst gate pulse period (d), as seen in FIG. 10(d), and the resultant difference is smoothed at an LPF 70 to control an fsc oscillator 68 thereby to eliminate the axial shift. A relation in this state between the modulated color signal (a) of the input and the Bb signal (e) is illustrated by FIG. 10(a) and FIG. 10(e). If the pulse generator 72 generates gate pulses (b), as seen in FIG. 10(b), for checking the first half of the burst and gate pulses (c), as seen in FIG. 10(c), for checking the second half of the burst, the output (e) of a code decider 63 takes a negative polarity with respect to a normal burst signal 75 and discontinuous burst signals 77 to 80 take a positive polarity at a first half and a negative polarity at a second half, as seen in FIG. 10(e). The Colorstripe decider (CS decider) 64 counts the number of positive polarity pulses in the signal (e) for one field and determines that Colorstripe data exists if the counted value exceeds a predetermined value. The result of this decision is outputted to a terminal 65 and sent to the microcomputer. Here, a signal to be inputted from a terminal 73 to the pulse generator 72 is a composite one separated from the input luminance signal.

Whether or not the Colorstripe data is determined on the basis of the phase of the burst signal, as described hereinbefore, it is, however, naturally necessary to perform management on the basis of the data (hereinafter called "APS" data) of the Colorstripe control, added to the same line as that of the aforementioned CGMS_A signal. The aforementioned data is composed of two bits, of which: 00 indicates a Colorstripe OFF; 01 a one-line Colorstripe; 10 a two-line Colorstripe; and 11 a four-line Colorstripe (as has been described with reference to FIG. 8(c)). In view of a decision indicating the existence of the Colorstripe and the APS data, therefore, the Colorstripe data is added. By detecting the Colorstripe data, as has been described hereinbefore, the copy guard signal can be added to the digital EE output even for a signal containing no APS data, but only Colorstripe data.

Although this embodiment has been described by reference to a digital VTR, a DVD disk apparatus, based on the arrangement of FIG. 3, can also employ the invention.

Figure 12:
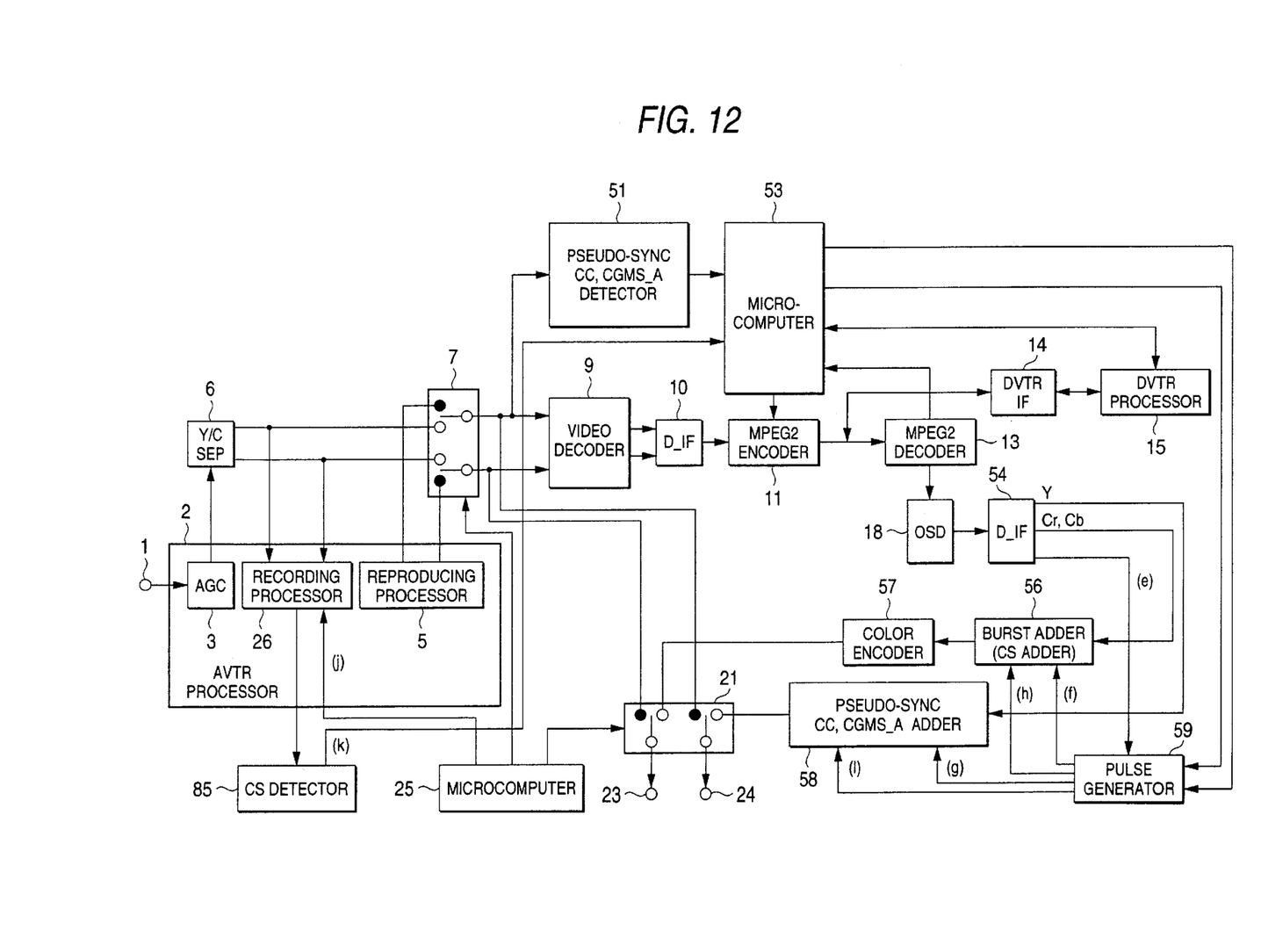
FIG. 12 is a block diagram showing a recording/reproducing apparatus according to a fifth embodiment of the invention.

A fifth embodiment of the invention will be described with reference to FIGS. 12 to 14. This embodiment is identical in its object to that of FIG. 7, but employs a different method of detecting the Colorstripe signals. The embodiment shown in FIG. 12 is directed to a VTR in which the analog VTR mode and the digital VTR mode are included together. In the household analog VTR of the prior art, an APC (Auto Phase Control) circuit is provided so that the reference signals (or the color subcarriers) to be used for the recording operation may be phase-locked with the burst signals of the inputted color signals. Thus, the Colorstripe signals are detected by the phase comparing output in the APC circuit. In FIG. 12, the phase comparing output, as obtained from the recording processor 26 in the analog VTR processor 2, is inputted to a Colorstripe detector 85 so that a signal (k) which indicates the existence of Colorstripe data is sent to the microcomputer 53. At this time, the APC circuit generally responds slowly with a considerable time constant, and the phase comparing signal itself is data smoothed by a LPF. The digital recording mode necessary for detecting the Colorstripe data is exclusively controlled with a control signal (j) from a microcomputer 25 so that the time constant may be reduced.

Figure 13:
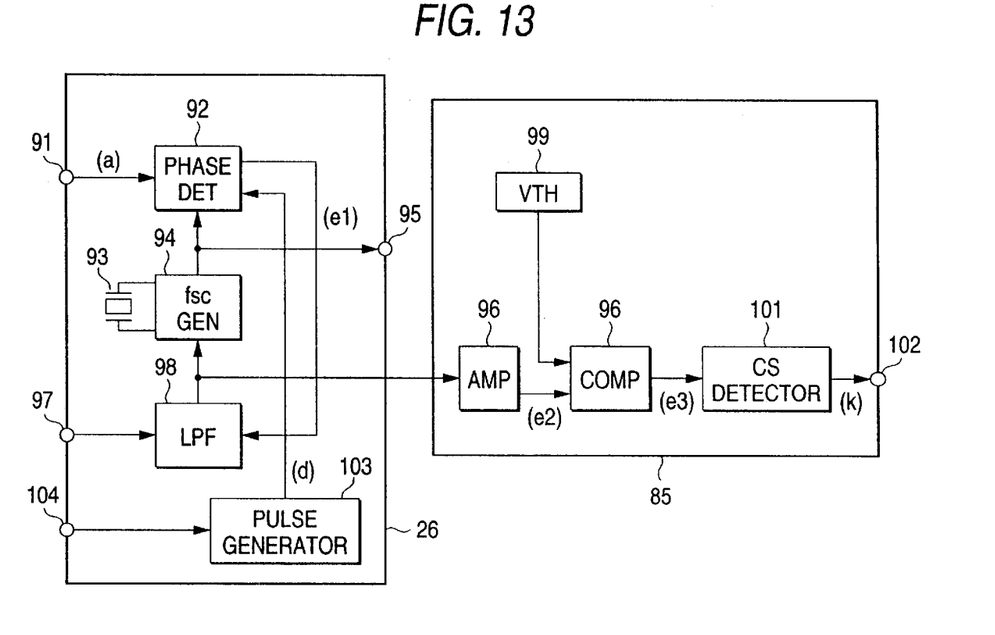
FIG. 13 is a block diagram showing details of the Colorstripe detector of the fifth embodiment.
Figure 14:
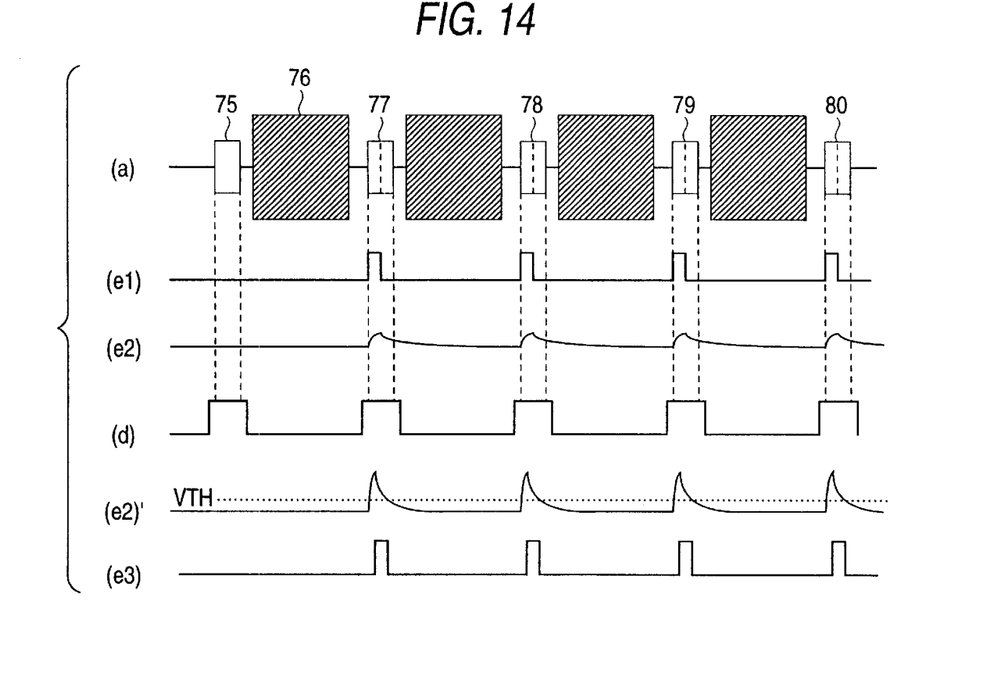
FIG. 14 is a diagram showing signal waveforms of individual portions at the time of operation the Colorstripe detector of FIG. 13.

FIG. 13 shows a specific construction of the CS detector 85. The color signal (a), as inputted at a terminal 91 of the recording processor 26 of the analog VTR, is compared in phase at a phase comparator 92 with the color subcarrier fsc, which is generated by a quartz oscillator 93 and a voltage-controlled oscillator 94. The resultant phase error (e1) is inputted to a loop filter or LPF 98 and is returned with a time constant for phase control to the voltage-controlled oscillator 94. Here, a pulse generator 103 generates the burst gate pulses (d) in response to a composite sync inputted from a terminal 104, and sends the pulses (d) to the phase detector 92 to perform a phase comparison only for the burst period. The analog VTR processor is generally constructed of an IC at present so that it is difficult to obtain the phase-detected output directly, and so the output of the LPF 98 generally is used for this purpose. With the time constant in the ordinary APC operation, therefore, the phase error is smoothed so that it is hard to detect, as indicated at (e2) in FIG. 14. Therefore, the time constant of the LPF 98 is reduced with the control signal in the 'High' digital mode inputted from a terminal 97, so that the phase error is inputted in a large state, as indicated at (e2'), to the Colorstripe detector 85. This signal is sufficiently amplified at an input side of the Colorstripe detector 85 by an amplifier 96 and is then compared at a comparator 100 with a threshold value Vth of a threshold generator 99. The resultant signal (e3) is supplied to the Colorstripe decider 101, and the result (k) is outputted to an output terminal 102. At the phase-inverted burst portion, as seen from (e1) of FIG. 14, there occurs a large phase error, on which the Colorstripe decision is made. As described hereinbefore, the Colorstripe decider can be exemplified by the novel constructions shown in FIGS. 7 and 9, or the constructions which make use of the analog VTR, as shown in FIGS. 12 and 13.

This embodiment has been described mainly with reference to DVTR having an MPEG2 CODEC (i.e., a general term including the encoder and the decoder). However, this embodiment can be likewise applied to a digital VTR based on DV standards using a magnetic tape of 6 mm width with different compressions, an apparatus for recording/reproducing on a media other than a magnetic tape, or a signal input/output device, all of which could employ the present invention. Here, this embodiment has been described with reference to NTSC broadcasting standards, but the invention can also be applied to PAL broadcasting standards, similar to the NTSC broadcasting standards.

According to the invention, as has been described hereinbefore, the means for effecting the recording process in the digital devices and the means for effecting the reproducing process from the digital devices can be realized without damaging the character data or the like superimposed over the vertical blanking period.

On the other hand, the signals, which are compressed/expanded in the recording/reproducing apparatus, are outputted as an EE (i.e., the output having passed only through the electric path to the monitor) screen to the monitor TV so that it is possible to check the quality of the picture, as recorded/reproduced in the digital device, at the recording time. It is further possible to manage the recording picture quality of the recording/reproducing apparatus even with a change in the recording transmission rate at the digital compression/expansion time.

By detecting the pseudo-sync data and the Colorstripe data, as deleted in the compression/expansion process, and by adding them to the MPEG-expanded signals, the analog video signals produced by adding pseudo-sync data identical to the input and the Colorstripe signals, can be produced in the compressed/expanded digital EE path, so that even a device having a digital EE output can perform a copy guard function relative to an external device.

On the other hand, a recording/reproducing apparatus having a high cost performance can be provided by making effective use of a highly fine digital OSD circuit, not only for the bit stream recording operation, but also for the signals to record/reproduce the inputs of the external video.

By detecting the pseudo-sync and the Colorstripe signals independently, moreover, an effect can be obtained which makes it possible to realize a sufficient copy preventing function even with respect to the input signals corresponding to only one of them. The Colorstripe data can be easily recognized by detecting the B-Y axis component of the incoming modulated color signals. In the device including the analog recording mode and the digital recording mode together, on the other hand, the Colorstripe data can be easily realized by the data of the APC (Auto Phase Control) circuit having an analog recording mode, thereby to lower the production cost.

The invention may be embodied in other specific forms without departing from the spirit or essential characteristics thereof. The present embodiments are, therefore, to be considered in all respects as illustrative but not restrictive, the scope of the invention being indicated by the appended claims rather than by the foregoing description and all changes which come within the meaning and range of equivalency of the claims are therefore intended to be embraced therein.

What is claimed is:

1. In a recording/reproducing apparatus having a converter which converts a first analog video signal into a digital signal; a compressor which compresses the converted digital signal; a recorder which records the compressed digital signal on a recording media; a reproducer which reproduces the compressed digital signal from the recording media; and an expander which expands the compressed digital signal, the improvement comprising:

a converter which converts a digital signal which is at least one of compressed and expanded into a second analog video signal; and a switcher which switches said first analog video signal before it is converted into a digital signal and said second analog video signal, whereby an output analog video signal is displayed in a picture display device; and wherein the improvement further comprises:

a detector which detects data, which is superimposed over a vertical blanking period and is deleted from the first analog video signal in the process of at least one of compression and expansion, at an upstream side of the compressor which compresses the converted digital signal;

a superimposer which encodes and superimposes said detected data over said compressed signal;

a processor which extracts said superimposed data from the compressed signal; and an adder which adds the extracted data to the signal expanded by the expander, whereby the output obtained from said adder is applied to said converter which produces said second analog video signal.

2. A recording/reproducing apparatus according to claim 1, wherein said compressor has a variable transmission rate, and wherein said second analog signal is utilized in a check mode for executing the optimum setting of said transmission rate for influencing picture quality.

3. A recording/reproducing apparatus according to claim 1, wherein a digital OSD (On Screen Display) is arranged to receive the output of said expander, whereby at the reproducing time and at the time of inputting an external analog video signal, said second analog video signal is supplied at an output of said switcher so that a digital OSD screen is displayed in a picture display device.

4. A recording/reproducing apparatus according to claim 1, wherein the path for obtaining said second analog video signal includes: a video decoder which decodes said first analog video signal into a luminance signal and a color difference signal; a compressor which compresses the output of the video decoder to produce a compressed signal; an expander which expands the compressed signal; an adder which adds said data which is superimposed over a vertical blanking period to the output of said expander; and a video encoder which converts the output of the adder into said second analog video signal, and wherein the output of said expander is supplied to a switch circuit which switches the output of said video decoder and the output of the expander; and a digital OSD circuit is connected to receive the output of the switch circuit.

5. A recording/reproducing apparatus according to claim 1, wherein the data extracted by said detector is sent through a microcomputer to said adder.

6. In a recording/reproducing apparatus having a converter which converts a first analog video signal into a digital signal; a compressor which compresses the converted digital signal; a recorder which records the compressed signal on a recording media; a reproducer which reproduces the digital signal from the recording media; and an expander which expands the compressed signal, said apparatus having a recording/reproducing digital mode and an analog mode for recording/reproducing said first analog video signal in the state of an analog signal, the improvement comprising:

a converter which converts a digital signal which is at least one of compressed and expanded into a second analog video signal; and a switcher which switches said first analog video signal before it is encoded and said second analog video signal, whereby an output analog video signal is displayed in a picture display device; and wherein the improvement further comprises:

a detector which detects data, which is superimposed over a vertical blanking period and is deleted from the first analog video signal in the process of at least one of compression and expansion, at an upstream side of the compressor which compresses the converted digital signal;

a superimposer which encodes and superimposes said detected data over said compressed signal;

a processor which extracts said superimposed data; and an adder which adds the extracted data to the signal expanded by the expander, whereby the output obtained from said adder is applied to said converter which produces said second analog signal.

7. A recording/reproducing apparatus according to claim 6, wherein the data extracted by said detector is sent through a microcomputer to said adder.

8. A recording/reproducing apparatus according to claim 6, wherein said compressor has a variable transmission rate, and wherein said second analog video signal is utilized in a check mode for executing the optimum setting of said transmission rate for influencing picture quality.

9. A recording/reproducing apparatus according to claim 6, wherein said compressor has a variable transmission rate, and wherein said second analog video signal is utilized in check mode for executing the optimum setting of said transmission rate for influencing a picture quality.

10. A recording/reproducing apparatus according to claim 9, wherein a digital OSD (On Screen Display) is arranged to receive the output of said expander, whereby at the reproducing time in the digital mode, at the time of inputting an external analog video signal, and at the reproducing time in the analog mode, said second analog video signal is supplied at an output of said switcher so that a digital OSD screen is displayed in a picture display device.

11. A recording/reproducing apparatus according to claim 6, wherein a digital OSD (On Screen Display) is arranged to receive the output of said expander, whereby at the reproducing time in the digital mode, at the time of inputting an external analog video signal, and at the reproducing time in the analog mode, said second analog video signal is supplied at an output of said switcher so that a digital OSD screen is displayed in a picture display device.

12. A recording/reproducing apparatus according to claim 11, wherein the path for obtaining said second analog video signal includes: a video decoder which decodes said first analog video signal into a luminance signal and a color difference signal; a compressor which compresses the output of the video decoder to produce a compressed signal; an expander which expands the compressed signal; an adder which adds said data to the output of said expander; and a video encoder which converts the output of the adder into said second analog video signal, and wherein the output of said expander is supplied to a switch circuit which switches the output of said video decoder and the output of the expander; and a digital OSD circuit is connected to receive the output of the switch circuit.

13. A recording/reproducing apparatus according to claim 6, wherein the path for obtaining said second analog video signal includes: a video decoder which decodes said first analog video signal into a luminance signal and a color difference signal; a compressor which compresses the output of the video decoder to produce a compressed signal; an expander which expands the compressed signal; an adder which adds said data to the output of said expander; and a video encoder which converts the output of the adder into said second analog video signal, and wherein the output of said expander is supplied to a switch circuit which switches the output of said video decoder and the output of the expander; and a digital OSD circuit is connected to receive the output of the switch circuit.

14. In a recording/reproducing apparatus having an AD converter which converts an input analog video signal into a digital signal; a compressor which compresses the output of said AD converter; a recorder which records the output of said compressor on a recording media; a reproducer which reproduces a digital signal from said recording media; an expander which expands the output of said reproducer; and a DA converter which converts the output of said expander into analog video signal, the improvement comprising:

a detector which detects first copy guard data superimposed over a vertical blanking period of said input analog video signal and second copy guard data superimposed over a color burst signal; and     an adder which adds said two copy guard data detected by said detector to the output of said expander, whereby the output of said compressor is fed to said expander in modes other than a reproducing mode by said reproducer.

15. A recording/reproducing apparatus according to claim 11, wherein the first and second copy guard data extracted by said detector are sent through a microcomputer to said adder.

16. A recording/reproducing apparatus according to claim 15, wherein said microcomputer adjusts a delay in the signal, caused in said compression/expansion process, and a delay in the first and second copy guard data extracted by said detector.

17. A recording/reproducing apparatus according to claim 14, wherein said second copy guard data is detected on the basis of a signal which is demodulated from an incoming modulated color signal with respect to a B-Y axis.

18. A recording/reproducing apparatus according to claim 14, further comprising: an analog recorder which records the input analog video signal on the recording media as it is in the analog state; and an analog reproducer which reproduces an analog signal from said recording media.

19. A recording/reproducing apparatus according to claim 18, wherein said detector detects said second copy guard signal on the basis of the data from an APC (Auto Phase Control) circuit, contained in said analog recorder for phase-locking a color burst signal contained in the input analog video signal and a color subcarrier to be used as a reference signal of said analog recorder.

20. An input/output device comprising: an AD converter which converts an input analog video signal into a digital signal; a compressor which compresses the output of said AD converter to produce a compressed signal; an expander which expands the compressed signal; and a DA converter which converts the output of said expander into an analog video signal, wherein the output of said compressor is fed to said expander; and further comprising:

a detector which detects first copy guard data superimposed over a vertical blanking period of said input analog video signal and second copy guard data superimposed over a color burst signal; and     an adder which adds said first and second copy guard data detected by said detector to the output of said expander.

21. An input/optput device according to claim 20, wherein the first and second copy guard data extracted by said detector are sent through a microcomputer to said adder.

22. An input/outputdevice according to claim 21, wherein said microcomputer adjusts a delay in the signal, caused in said compression/expansion process, and a delay in the first and second copy guard data extracted by said detector.

23. An input/output device according to claim 21, wherein said second copy guard data is detected on the basis of a signal which is demodulated from an incoming modulated color signal with respect to a B-Y axis.

* * * * *